H. J. SWANKE.
DRAFT TREE.
APPLICATION FILED FEB. 19, 1915.
1,219,883.
Patented Mar. 20, 1917.
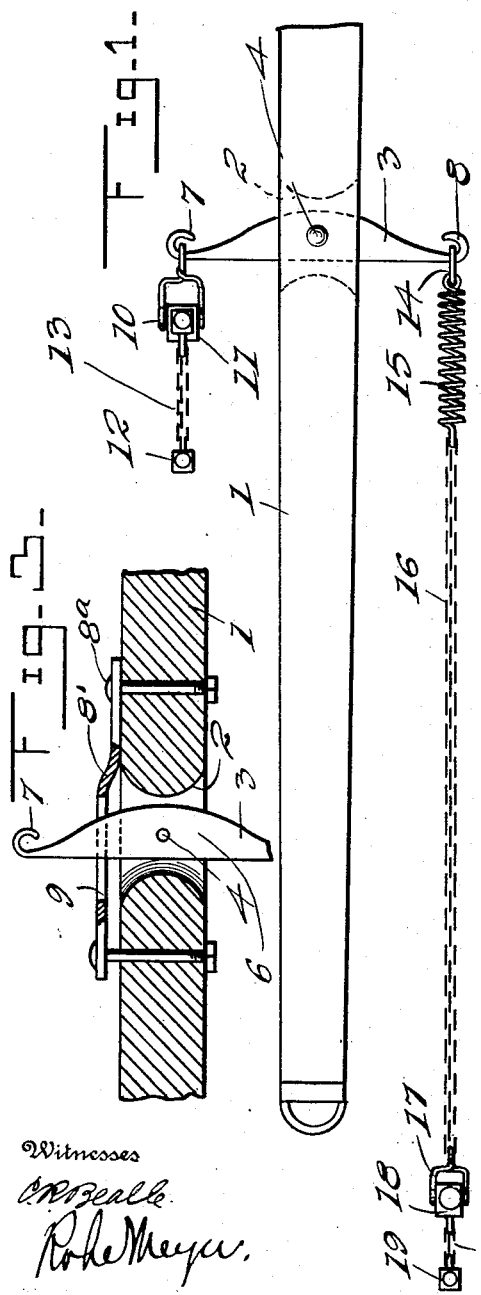
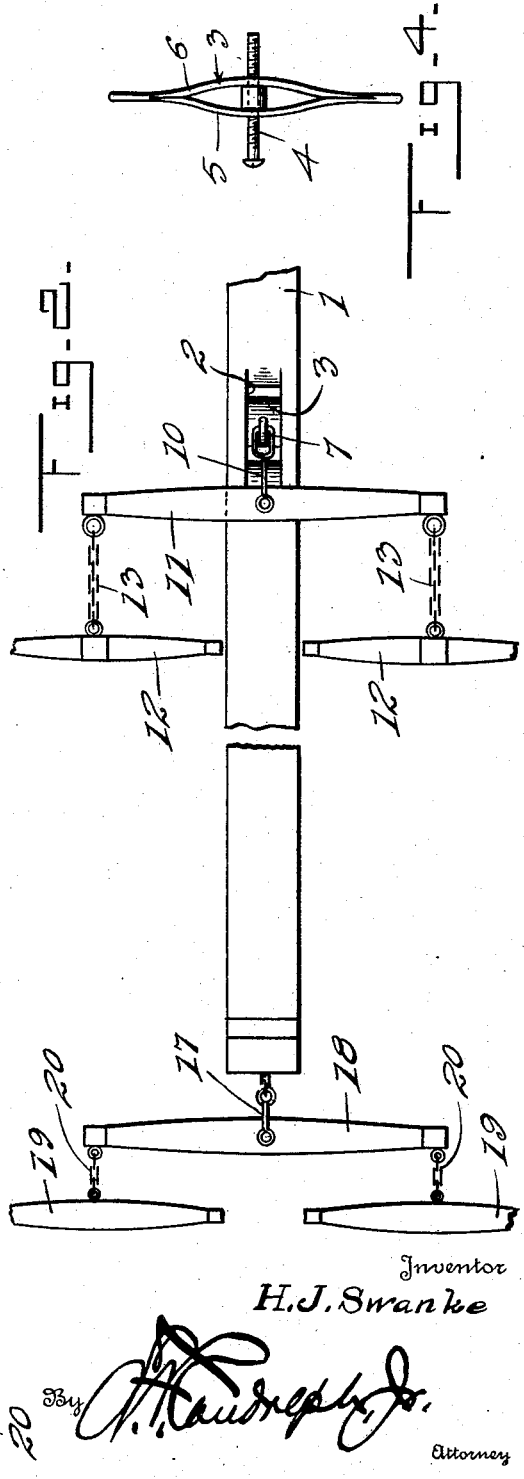
Witnesses
C. R. Beall
Rob. E. Meyer
Inventor
H. J. Swanke
By [signature]
Attorney

UNITED STATES PATENT OFFICE.

HERMAN J. SWANKE, OF DODSON, MONTANA.

DRAFT-TREE.

1,219,883.  Specification of Letters Patent.  Patented Mar. 20, 1917.

Application filed February 19, 1915. Serial No. 9,372.

*To all whom it may concern:*

Be it known that I, HERMAN J. SWANKE, a citizen of the United States, residing at Dodson, in the county of Phillips and State of Montana, have invented certain new and useful Improvements in Draft-Trees; and I do hereby declare the following to be a full, clear, and exact description of the invention, such as will enable others skilled in the art to which it appertains to make and use the same.

This invention relates to draft trees, and the primary object of the invention is to provide a device as specified by means of which four or more draft animals may be hitched to a device to be drawn, and their pull equally distributed.

Another object of this invention is to provide a draft tree embodying a pivotally supported equalizing bar carried by the tongue of the vehicle to be drawn, which extends vertically with respect to the tongue and has connected to its upper and lower ends, suitable connecting means for attaching double or swingle trees thereto.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved draft tree,

Fig. 2 is a top plan view of the draft tree,

Fig. 3 is a fragmentary longitudinal section through the tree,

Fig. 4 is an edge view of the pivoted equalizing bar.

Referring more particularly to the drawings, 1 designates the tongue or pole of a vehicle, which tongue is provided with a slot 2 formed therein and extending vertically therethrough. The front and rear walls of the slot 2 are curved, or arcuate, as is clearly shown in Fig. 3 of the drawings. An evener bar 3 is pivotally mounted upon a bolt 4, and positioned within the slot 2. The evener bar 3 is constructed of a pair of plates 5 and 6 which are bowed from each other intermediate of their ends, and have their ends connected. The connected ends of the evener bar 3 have hooks 7 and 8 formed thereon. A plate 8' is secured to the upper surface of the tongue 1 and is bent upwardly, having a section of its length spaced from the under surface of the tongue, which section is provided with a slot 9, through which the upper end of the evener bar 3 extends.

The upper end of the evener bar 3 has a clevis 10 detachably mounted upon the hooks 7 and 8 thereof, which clevis is connected to a doubletree 11. Swingletrees 12 are connected to the ends of the doubletree 11 by flexible members 13, and they are provided for hitching draft animals to the vehicle to be drawn.

The lower hook 8 of the evener bar 3 has a link 14 connected thereto, to which link is connected a spiral spring 15. The spiral spring 15 extends forwardly from the lower end of the evener bar 3 and has a flexible member 16 detachably connected thereto. The flexible member 16 extends forwardly beyond the forward end of the tongue 1 and has a clevis 17 connected thereto, which clevis is in turn connected to a doubletree 18. The doubletree 18 has swingletrees 19 connected thereto by means of a flexible member 20.

In the application of the improved draft tree, the team of draft animals, known as the pole team, are hitched to the swingletrees 12, and the forward team to the swingletrees 19, which provide a four-horse hitch. The spiral spring 15 is provided for "picking up" the slack from the lead team when going down grade, for preventing the doubletree 18 or the swingletrees 19 from striking the animals' heels.

When it is desired to use a single team in connection with the draft tree hereinbefore described, the clevis 17 may be attached to the neck yoke for balancing the evener bar 3, and the doubletree 11 may be attached to the tongue 1 and the plate 8' by means of the bolt 8ᵃ.

In reducing the invention to practice certain minor features of construction, combination and arrangement of parts may necessitate alteration, to which the patentee is entitled provided such alterations are comprehended within the scope of what is claimed.

What is claimed is:—

In a draft tree structure, a vehicle tongue having a slot extending therethrough, an evener bar extending through said slot and pivotally connected intermediate its end to said tongue, the end walls of said slot being convex for increasing the length of the slot at the outer surfaces of the tongue for increasing the swinging scope of the evener, said evener having its ends reduced in width and curved to form attaching hooks, an ordinary doubletree connected to the hook formed upon the upper end of said evener, a coil spring connected to the hook on the lower end of said evener, a flexible member connected to said spring and extending beyond the forward end of the tongue, and a swingletree connected to the forward end of said flexible member.

In testimony whereof I affix my signature in presence of two witnesses.

HERMAN J. SWANKE.

Witnesses:
W. O. SAMPSON,
V. M. MOEN.